(12) United States Patent
Tsotsis

(10) Patent No.: US 9,315,633 B2
(45) Date of Patent: Apr. 19, 2016

(54) NANOMODIFIED BACKBONES FOR POLYIMIDES WITH DIFUNCTIONAL AND MIXED-FUNCTIONALITY ENDCAPS

(71) Applicant: THE BOEING COMPANY, Chicago, IL (US)

(72) Inventor: Thomas K. Tsotsis, Santa Ana, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/473,169

(22) Filed: Aug. 29, 2014

(65) Prior Publication Data

US 2016/0060400 A1 Mar. 3, 2016

(51) Int. Cl.
 *C08G 77/388* (2006.01)

(52) U.S. Cl.
 CPC .................................. *C08G 77/388* (2013.01)

(58) Field of Classification Search
 None
 See application file for complete search history.

(56) References Cited

U.S. PATENT DOCUMENTS

| | | | |
|---|---|---|---|
| 4,847,333 A * | 7/1989 | Lubowitz et al. | 525/432 |
| 4,981,922 A * | 1/1991 | Sheppard et al. | 525/422 |
| 5,126,410 A * | 6/1992 | Lubowitz et al. | 525/417 |
| 5,159,055 A * | 10/1992 | Sheppard et al. | 528/322 |
| 5,516,876 A * | 5/1996 | Lubowitz et al. | 528/170 |
| 5,599,993 A | 2/1997 | Hergenrother et al. | |
| 5,645,925 A * | 7/1997 | Sheppard et al. | 442/128 |
| 5,654,396 A * | 8/1997 | Lubowitz et al. | 528/353 |
| 5,681,967 A | 10/1997 | Hergenrother et al. | |
| 5,689,004 A | 11/1997 | Connell et al. | |
| 5,766,764 A * | 6/1998 | Olli et al. | 428/407 |
| 5,817,744 A | 10/1998 | Sheppard et al. | |
| 5,968,640 A * | 10/1999 | Lubowitz et al. | 442/110 |
| 5,969,079 A * | 10/1999 | Lubowitz et al. | 528/170 |
| 5,998,550 A | 12/1999 | Arnold et al. | |
| 6,124,035 A | 9/2000 | Connell et al. | |
| 6,344,523 B1 | 2/2002 | Hawthorne et al. | |
| 6,441,099 B1 | 8/2002 | Connell et al. | |
| 6,911,519 B2 | 6/2005 | Scola et al. | |
| 7,825,211 B2 | 11/2010 | Lubowitz et al. | |
| 8,063,168 B2 * | 11/2011 | Tsotsis et al. | 528/128 |
| 8,106,142 B2 | 1/2012 | Tsotsis et al. | |
| 8,309,663 B2 | 11/2012 | Lubowitz et al. | |
| 2005/0154150 A1 | 7/2005 | Wei et al. | |
| 2007/0265424 A1 | 11/2007 | Whiteker et al. | |
| 2008/0300360 A1 | 12/2008 | Lubowitz et al. | |
| 2008/0300374 A1 | 12/2008 | Lubowitz et al. | |
| 2010/0204412 A1 | 8/2010 | Tsotsis et al. | |
| 2010/0204485 A1 | 8/2010 | Tsotsis et al. | |

OTHER PUBLICATIONS

Tsotsis et al. "Novel Resins and Endcaps for High-Temperature Composites" Conference paper, Jan. 2008, 12 pages.*
Pinson et al. "Thermosetting Poly(imide silsesquioxane)s Featuring Reduced Moisture Affinity and Improved Processability" Macromolecules 2013, 46, 7363-7377.*
Wright et al. "Synthesis and Thermal Curing of Aryl-Ethynyl-Terminated coPOSS Imide Oligomers: New Inorganic/Organic Hybrid Resins" Chem. Mater. 2003, 15, 264-268.*
Minton et al. "Atomic Oxygen Effects of POSS Polyimides in Low Earth Orbit" ACS Appl. Mater. Interfaces 2012, 4, 492-502.*
Lee et al, Isomeric Effects on Physical and Thermal Characteristics of Phenylethynylphthalimide Poss, Polymer Preprints 2011, 52(2), 131.
Seurer et al, Thermal Transitions and Reaction Kinetics of Polyhederal Silsesquioxane Containing Phenylethynylphthalimides (Preprint), Air Force Research Laboratory (AFMC), Mar. 18, 2010.
Nagendiran et al, Octasilsesquioxane-reinforced DGEBA and TGDDM Epoxy Nanocomposites: Characterization of Thermal, Dielectric and Morphological Properties, Acta Materialia, vol. 58, Issue 9, May 2010.
Chandramohan et al, Synthesis and Characterization of Epoxy Modified Cyanate Ester POSS Nanocomposites, High Performance Polymers, Aug. 2012, vol. 24, No. 5.
Mahmoodi et al, Amine-functionalized Silica Nanoparticle: Preparation, Characterization and Anionic Dye Removal Ability, Desalination, 279 (2011).
Kwon et al, Fabrication of Polyimide Composite Films Based on Carbon Black for High-Temperature Resistance, Polymer Composites, 2014.
Extended European Search Report for EP 15182229, Jan. 7, 2016.

* cited by examiner

*Primary Examiner* — Robert S Loewe
(74) *Attorney, Agent, or Firm* — Patterson & Sheridan, LLP

(57) ABSTRACT

Polyimides containing a backbone with at least one nanoparticle component and made from oligomers having endcaps that are difunctional or a mix of di- and monofunctionality are provided. The endcaps may be nadic or phenylethynyl. The backbone may be wholly inorganic or made from a mixture of inorganic and organic groups. The oligomers may be created in-situ using standard polymerization of monomeric reactants chemistry using a solvent or may be provided as a pre-imidized compound that may be either a solid or liquid. It is believed that the nanoparticle component of the polymer backbone provides superior thermo-oxidative stability verses unmodified organic backbones. It is further believed that providing difunctional or a mixture of di- and monofunctional endcaps allows for increased crosslinking to provide improved strength and stiffness verses wholly monofunctional endcapped oligomers for polyimides. The nanoparticle is part of the backbone of the polymer and not solely a pendant group.

20 Claims, No Drawings

NANOMODIFIED BACKBONES FOR POLYIMIDES WITH DIFUNCTIONAL AND MIXED-FUNCTIONALITY ENDCAPS

FIELD

The implementations described herein generally relate to polyimide oligomers with nanomodified backbones and more particularly to polyimide oligomers having nanomodified backbones with functional endcaps, resin systems including the polyimide oligomers with nanomodified backbones, composites formed therefrom and to their methods of use.

BACKGROUND

Only a few of the thermosetting resins that are commonly used today in fiber-reinforced composites generally can be used in high-temperature applications (e.g., aerospace applications). These high-temperature thermosetting resins are undesirable in many applications because they often form brittle composites that have relatively low thermal stabilities.

Recently, chemists have sought to synthesize oligomers for high-performance, high-temperature advanced composites suitable for high-temperature applications. These composites should exhibit solvent resistance, be tough, impact resistant and strong, and be easy to process. Oligomers and composites that have thermo-oxidative stability are particularly desirable.

Imides and many other resin backbones have shown surprisingly high glass-transition temperatures, reasonable processing parameters and desirable physical properties for high-performance, high-temperature composites. However, typical polyimides are susceptible to thermo-oxidative aging that reduces their long-term strength and stiffness. Further, most formulations for high-temperature polymer-matrix composites have monofunctional endcaps which limit the degree of crosslinking that can be attained.

Accordingly, there remains a need in the art for polyimide oligomers having high thermo-oxidative stability with improved crosslinking and composites formed therefrom.

SUMMARY

The implementations described herein generally relate to polyimide oligomers with nanomodified backbones and more particularly to polyimide oligomers having nanomodified backbones with functional endcaps, resin systems including the polyimide oligomers with nanomodified backbones, composites formed therefrom and to their methods of use.

According to one implementation described herein, a resin system is provided. The resin system comprises a first capped oligomer having the formula:

$$Y_i\text{-}A\text{-}Y_i,$$

wherein:
i=1 or 2;
Y is a nadic or a dinadic functional endcap; and
A is a chemical backbone, wherein the chemical backbone comprises one or more nanoparticles. The resin system further comprises a second capped oligomer having the formula:

$$D_i\text{-}Q\text{-}D_i,$$

wherein:
i=1 or 2;
D is a nadic or a dinadic functional endcap; and
Q is a hydrocarbon backbone.

In another implementation described herein, a polyimide oligomer is provided. The polyimide oligomer has the formula:

$$Y_i\text{-}A\text{-}Y_i,$$

wherein:
i=1 or 2;
Y is a nadic or dinadic functional endcap; and
A is a chemical backbone, wherein the chemical backbone comprises one or more nanoparticles. The polyimide oligomer may be included in a resin system that further comprises at least one nadic or dinadic endcapped chemical backbone different from the chemical backbone A comprising the nanoparticle.

In another implementation, a polyimide oligomer comprising at least one nadic or dinadic amine functional endcap monomer and at least one chemical backbone, wherein the chemical backbone comprises one or more nanoparticles is provided.

In yet another implementation, a resin system is provided. The resin system comprises at least one nadic or dinadic endcapped chemical backbone, wherein the chemical backbone comprises a nanoparticle and at least one nadic or dinadic endcapped chemical backbone different from the chemical backbone comprising the nanoparticle. The at least one nadic or dinadic endcapped nanoparticle comprising chemical backbone may comprise at least one nadic or dinadic endcapped chemical backbone, wherein the chemical backbone has a nanoparticle incorporated in the chemical backbone and at least one nadic or dinadic endcapped nanoparticle.

In yet another implementation, a resin system is provided. The resin system comprises the reaction product of one or more nanoparticles possessing anhydride or amine functionality, at least one of nadic and dinadic endcap monomers possessing anhydride or amine functionality, and one or more oligomer backbones possessing anhydride or amine functionality such that the resin system may be reacted in-situ to form endcapped imide oligomers that may be subsequently reacted to form polyimides.

In yet another implementation, a resin system is provided. The resin system comprises a first capped oligomer having the formula:

$$Y_i\text{-}A\text{-}Y_i,$$

wherein:
i=1 or 2;
Y is a phenylethynyl or a diphenylethynyl functional endcap; and
A is a chemical backbone, wherein the chemical backbone comprises one or more nanoparticles. The resin system further comprises a second capped oligomer having the formula:

$$D_i\text{-}Q\text{-}D_i,$$

wherein:
i=1 or 2;
D is a phenylethynyl or a diphenylethynyl functional endcap; and
Q is a hydrocarbon backbone.

In yet another implementation, a polyimide oligomer is provided. The polyimide oligomer has the formula:

$$Y_i\text{-}A\text{-}Y_i,$$

wherein:
i=1 or 2;
Y is a diphenylethynyl functional endcap; and
A is a chemical backbone, wherein the chemical backbone comprises one or more nanoparticles.

The features, functions, and advantages that have been discussed can be achieved independently in various implementations or may be combined in yet other implementations, further details of which can be seen with reference to the following description and drawings.

DETAILED DESCRIPTION

The following disclosure describes polyimide oligomers with nanomodified backbones and more particularly to polyimide oligomers having nanomodified backbones with functional endcaps, resin systems including the polyimide oligomers with nanomodified backbones, composites formed therefrom and to their methods of use. Certain details are set forth in the following description to provide a thorough understanding of various implementations of the disclosure. Other details describing well-known details often associated with polyimide oligomers, resin systems, and composites formed therefrom are not set forth in the following disclosure to avoid unnecessarily obscuring the description of the various implementations.

Different aspects, implementations and features are defined in detail herein. Each aspect, implementation or feature so defined may be combined with any other aspect(s), implementation(s) or feature(s) (preferred, advantageous or otherwise) unless clearly indicated to the contrary.

As used herein, the terms "substituent", "radical", "group", "moiety" and "fragment" may be used interchangeably.

As used herein, the symbol "H" denotes a single hydrogen atom and may be used interchangeably with the symbol "—H". "H" may be attached, for example, to an oxygen atom to form a "hydroxy" radical (i.e., —OH), or two "H" atoms may be attached to a carbon atom to form a "methylene" (—CH$_2$—) radical.

The terms "hydroxyl" and "hydroxy" may be used interchangeably.

If a substituent is described as being "optionally substituted," the substituent may be either (1) not substituted or (2) substituted on a substitutable position. If a substitutable position is not substituted, the default substituent is H.

Singular forms "a" and "an" may include plural reference unless the context clearly dictates otherwise.

The number of carbon atoms in a substituent can be indicated by the prefix "$C_{A\text{-}B}$" where A is the minimum and B is the maximum number of carbon atoms in the substituent.

As used herein, the term "halo" refers to fluoro (—F), chloro (—Cl), bromo (—Br) or iodo (—I).

As used herein, the term "alkyl" embraces a linear or branched acyclic alkyl radical containing from 1 to about 15 carbon atoms. In some implementations, alkyl is a $C_{1\text{-}10}$ alkyl, $C_{1\text{-}6}$, alkyl or $C_{1\text{-}3}$ alkyl radical. Examples of alkyl include, but are not limited to, methyl, ethyl, propyl, isopropyl, butyl, isobutyl, tert-butyl, sec-butyl, pentan-3-yl i.e., (i.e., 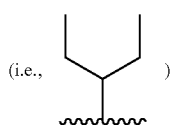 [SMILES: *C(CC)CC] )

and the like.

As used herein, "lower alkyl" refers to an alkyl group containing from 1 to 6 carbon atoms, and may be straight chain or branched, as exemplified by methyl, ethyl, n-butyl, i-butyl, t-butyl. "Lower alkenyl" refers to a lower alkyl group of 2 to 6 carbon atoms having at least one carbon-carbon double bond.

As used herein, the term "alkynyl" refers to an unsaturated, acyclic hydrocarbon radical with at least one triple bond. Such alkynyl radicals contain from 2 to about 15 carbon atoms. Non-limiting examples of alkynyl include ethynyl, propynyl and propargyl.

As used herein, the term "hydroxyalkyl" embraces alkyl substituted with one or more hydroxyl radicals. Hydroxyalkyl embraces, for example, monohydroxyalkyl, dihydroxyalkyl and trihydroxyalkyl. More specific examples of hydroxyalkyl include hydroxymethyl, hydroxyethyl and hydroxypropyl (e.g., 2-hydroxypropan-2-yl).

As used herein, the term "haloalkyl" embraces alkyl substituted with one or more halo radicals. Examples of haloalkyl include monohaloalkyl, dihaloalkyl and trihaloalkyl. A monohaloalkyl radical, for example, may have either a bromo, chloro, fluoro or iodo atom. A dihalo radical, for example, may have two of the same halo radicals or a combination of different halo radicals. A trihaloalkyl radical may have three of the same halo radicals or a combination of different halo radicals. Non-limiting examples of haloalkyl include fluoromethyl, difluoromethyl, trifluoromethyl (or $CF_3$), difluoroethyl, trifluoroethyl, difluoropropyl, tetrafluoroethyl, pentafluoroethyl, heptafluoropropyl, chloromethyl, dichloromethyl, trichloromethyl, dichloroethyl, trichloroethyl, dichloropropyl, tetrachloroethyl, pentachloroethyl, heptachloropropyl, dichlorofluoromethyl, difluorochloromethyl, bromomethyl, dibromomethyl, tribromomethyl, iodomethyl, diiodomethyl and triiodomethyl.

As used herein, the term "alkoxy" is RO— where R is alkyl. Non-limiting examples of alkoxy include methoxy, ethoxy, propoxy and tert-butyloxy. The terms "alkyloxy", "alkoxy" and "alkyl-O—" may be used interchangeably.

As used herein, the term "lower alkoxy" refers to alkoxy groups having 1-6 carbon atoms in a straight or branched chain.

As used herein, the term "substituted aryl" and "substituted lower alkylaryl" and "substituted heteroaryl" and "substituted lower alkylheteroaryl" refer to aryl, heteroaryl, lower alkylaryl and lower alkylheteroaryl groups wherein the aryl and heteroaryl group may be substituted with 1-3 substituents selected from lower alkyl, lower alkoxy, halogeno (i.e., chloro, fluoro, bromo and iodo), amino, carboxy and lower alkoxy carbonyl.

As used herein, the term "alkoxyalkyl" is ROR—, where R is alkyl. Examples of alkoxyalkyl radicals include methoxymethyl, methoxyethyl, methoxypropyl, ethoxyethyl and 2-methoxypropan-2-yl. The terms "alkoxyalkyl" and "alkyl-O-alkyl" may be used interchangeably.

As used herein, the term "amide" refers to a moiety containing the —CONH$_2$-group.

As used herein, the term "amideimide" refers to a moiety containing both an amide and imide group as described herein.

As used herein, the term "amino" refers to NH$_2$, NHR, or NR$_2$ where R is an organic group.

As used herein, the term "aralkoxy" embraces arylalkyl attached to a parent molecular scaffold through an oxygen atom. The terms "arylalkoxy" and "aralkoxy" may be used interchangeably.

As used herein, the term "aryl" refers to any monocyclic, bicyclic or tricyclic cyclized carbon radical, wherein at least one ring is aromatic. An aromatic radical may be fused to a non-aromatic cycloalkyl or heterocyclyl radical. Examples of aryl include phenyl and naphthyl.

As used herein, the term "aryloxy" is RO—, where R is aryl.

As used herein, the term "carbonyl" denotes a carbon radical having two of four covalent bonds shared with a single oxygen atom (e.g., 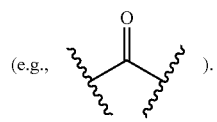 ).

As used herein, the term "carboxy" embraces hydroxyl attached to one of two unshared bonds in a carbonyl radical (e.g., 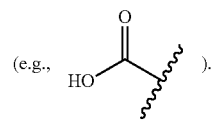 ).

As used herein, the term "cyclic ring" embraces any aromatic or non-aromatic cyclized carbon radical (e.g., aryl and cycloalkyl, respectively) which may contain one or more ring heteroatoms (e.g., heterocyclyl and heteroaryl).

As used herein, the term "cycloalkyl" embraces any monocyclic, bicyclic or tricyclic cyclized carbon radical of 3 to about 15 carbon atoms that is fully or partially saturated. Cycloalkyl may be fused, for example, to an aryl, cycloalkyl or a heterocyclyl radical. Cycloalkyl may be substituted with, for example, alkyl, alkoxy, alkoxyalkyl, hydroxyl, hydroxyalkyl, amido, carboxy, acyl, carbamido, cyano, aminoalkyl, thiolalkyl, halo and/or haloalkyl.

As used herein, the term "ester" refers to the product of the reaction between a carboxylic acid and an alcohol (e.g., 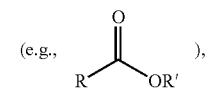 ), where R and R' are the organic groups.

As used herein, the term "estersulfone" refers to a moiety containing both an ester and a sulfone group as described herein.

As used herein, the term "ether" refers to a moiety containing the functional group RO—R' where R and R' are the organic groups.

As used herein, the term "etherimide" refers to a moiety containing both an ether and an imide group as described herein.

As used herein, the term "ethersulfone" refers to a moiety containing both an ether and a sulfone group as described herein.

As used herein, the term "heterocyclyl sulfone" refers to a moiety containing both a heterocyclyl and a sulfone group as described herein.

As used herein, the term "heterocyclyl" refers to any monocyclic, bicyclic or tricyclic ring system having from 5 to about 15 ring members selected from carbon, nitrogen, sulfur and oxygen, wherein at least one ring member is a heteroatom. Heterocyclyl embraces a fully saturated, partially saturated and fully unsaturated radical (e.g., heteroaryl). Heterocyclyl may be fused to another heterocyclyl, aryl or cycloalkyl radical.

Heterocyclyl embraces combinations of different heteroatoms within the same cyclized ring system. When nitrogen is a ring member, heterocyclyl may be attached to the parent molecular scaffold through a ring nitrogen. Non-limiting examples of fully saturated five and six-membered heterocyclyl include: pyrrolidinyl, imidazolidinyl, piperidinyl, piperazinyl, tetrahydrofuranyl, morpholinyl and thiazolidinyl. Examples of partially saturated heterocyclyl include dihydrothiophenyl ( 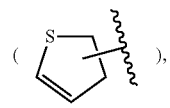 ), dihydropyranyl, dihydrofuranyl and dihydrothiazolyl.

Heterocyclyl may be substituted with, for example, one or more alkyl, alkoxy, alkoxyalkyl, hydroxyl, hydroxyalkyl, amido, carboxy, acyl, carbamido, cyano, aminoalkyl, thiolalkyl, halo and haloalkyl radicals. Non-limiting examples of substituted heterocyclyl include 5- or 6-membered heterocyclyl substituted with one or more alkyl, alkoxy, alkoxyalkyl, hydroxyl, hydroxyalkyl, amido, carboxy, acyl, carbamido, cyano, aminoalkyl, thiolalkyl, halo and haloalkyl radicals. Substituted and un-substituted 5- and 6-membered heterocyclyl may be fused to an additional heterocyclyl, aryl or cycloalkyl radical.

As used herein, the term "imide" refers to a functional group having two carbonyl groups bridged through an amino group. The general formula of an imide is:

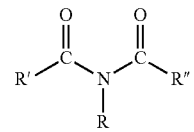

where R, R' and R" are organic groups.

As used herein, the term "imidazole" refers to a moiety with the formula $C_3H_4N_2$. This aromatic heterocyclic is classified as an alkaloid.

As used herein, the term "imidazolyl" refers to any of four monovalent radicals with the formula $C_3H_3N_2$ derived from imidazole by removal of one hydrogen atom (e.g., 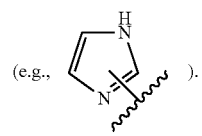 ).

As used herein, the term "imidesulfone" refers to a moiety containing both an imide and a sulfone group as described herein.

As used herein, the term "imidazolyl sulfone" refers to a moiety containing both an imidazolyl and a sulfone group as described herein.

As used herein, the term "moiety" is referred to throughout primarily as univalent chemical moieties (e.g., alkyl, aryl, etc.). Nevertheless, such terms are also used to convey corresponding multivalent moieties under the appropriate structural circumstances clear to those skilled in the art. For example, while an "alkyl" moiety generally refers to a monovalent radical (e.g., CH₃—CH₂—), in certain circumstances a bivalent linking moiety can be "alkyl," in which case those skilled in the art will understand the alkyl to be a divalent radical (e.g., —CH₂—CH₂—), which is equivalent to the term "alkylene." Similarly, in circumstances in which a divalent moiety is required and is stated as being "aryl," those skilled in the art will understand that the term "aryl" refers to the corresponding multivalent moiety, arylene. All atoms are understood to have their normal number of valences for bond formation (i.e., 1 for H, 4 for carbon, 3 for N, 2 for O, and 2, 4, or 6 for S, depending on the oxidation state of the S).

As used herein, the term "oligomer" is a molecule possessing from about 1 to 30 monomers. Specific oligomers that are used with the implementations described herein include, for example, those having a variety of geometries such as linear, branched, or forked.

As used herein, the term "oxazole" refers to a five-member heterocycle having three carbon atoms, one oxygen atom, one nitrogen atom and two double bonds; the 1,3-isomer is aromatic.

As used herein, the term "oxazolyl" refers to a radical derived from oxazole (e.g., 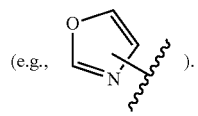 ).

As used herein, the term "oxazolyl sulfone" refers to a moiety containing both an oxazolyl and a sulfone group as described herein.

As used herein, the term "sulfone" refers to a moiety containing a sulfonyl functional group attached to two carbon atoms. The central sulfur atom is twice double bonded to oxygen and has two further organic groups. The general structural formula is R—S(=O)(=O)—R' where R and R' are the organic groups.

As used herein, the term "thiazole" refers to any of a class of unsaturated heterocyclic compounds or moieties containing a ring of three carbon atoms, a sulfur and a nitrogen atom; for example, C₃H₃SN.

As used herein, the term "thiazolyl" refers to a radical derived from thiazole (e.g., 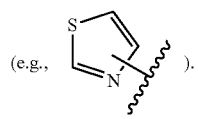 ).

As used herein, the term "thiazolyl sulfone" refers to a moiety containing both a thiazolyl and a sulfone group as described herein.

Polyimides containing a backbone with at least one nanoparticle component and made from oligomers having endcaps that are monofunctional, difunctional or a mix of di- and monofunctional are disclosed below in detail. Exemplary endcaps that may be used with the implementations described herein include, for example, nadic, dinadic, phenylethynyl and diphenylethynyl endcaps. The backbone may be wholly inorganic or made from a mixture of inorganic and organic groups. The backbone may further include aromatic (e.g., phenyl) radicals between linkages, although the backbone may have other aromatic, aliphatic, or aromatic and aliphatic radicals. The oligomers may be created in-situ using standard polymerization of monomeric reactant (PMR) chemistry using a solvent or may be provided as a pre-imidized compound that may be either a solid or liquid.

Inclusion of the nanoparticle component in the polymer backbone is believed to provide superior thermo-oxidative stability verses the unmodified organic backbones currently used in the art. Further, providing difunctional or a mixture of di- and monofunctional endcaps allows for increased crosslinking to provide improved strength and stiffness verses wholly monofunctional endcapped oligomers for polyimides. The nanoparticles are present in the backbone and preferably are not present as a pendant side group or in a pendant chain along the backbone. In certain implementations, however, nanoparticles can be incorporated into the backbone and also incorporated into pendant side chains from the backbone.

The polyimides with nanomodified backbones and the resin systems described herein are suitable for use in, among other things, thermoset composites.

Devising high-temperature composites that balance stiffness/strength and toughness properties (impact strength) for different high-temperature applications is a challenge. Polyimide oligomers without stiff chain segments tend to soften significantly with increasing temperature. Polyimide oligomers made with stiff backbones to improve their property retention with temperature generally are very difficult to process except at very high temperatures and, even in most cases, the ability to process may be very low. Incorporation of functionalized, stiff, nanoscale particles directly into the backbone of the polyimide oligomer used for producing composites should provide a balance of improved stiffness and processability to provide the desired properties of improved toughness with minimal adverse effects on other composite properties. It is believed that only a small amount of functionalized nanoparticles is required to stiffen the polyimide oligomers as incorporation of such particles directly into the oligomer backbone should increase stiffness above what would be expected from the rule of mixtures because the stiffness is imparted directly, not through van der Waals interactions with the nanoparticles.

Polyimide oligomers for use in high-temperature polymer-matrix composites are disclosed below in detail. Polyimide oligomers according to the present disclosure provide composites with significantly improved mechanical properties and increased thermo-oxidative stability.

Polyimide oligomers according to implementations of the present disclosure can have amine, anhydride, hydroxy, or acid chloride functionality to react with endcaps of various different functionalities. For example, amine-functional backbones can react with anhydride-functional endcaps; acid chloride-functional backbones can react with amine-functional endcaps; etc. Polyimide oligomers according to implementations of the present disclosure can be made from several routes, including, for example, starting with brominated compounds that are reacted with phenylacetylene, using palladium-based catalysts, to replace the bromines with phenylethynyl moieties.

Several commercially available nanoparticles can be incorporated into a variety of suitable oligomeric backbones for high-temperature polymer-matrix composites. Suitable nanoparticles include any nanoparticle capable of incorporation into the polyimide oligomer backbone that provides improved thermo-oxidative stability. The nanoparticle may be an organic nanoparticle. The nanoparticle may be an inorganic nanoparticle. The nanoparticle may be combination of both organic and inorganic components. By way of example, nanoparticles, suitable for use in the implementations of the present disclosure may be made from any of the following, including, but not limited to, inorganic material, for example, metal oxides, such as, but not limited to, silica, silicates, alumina, aluminum oxide, titanium oxide, or semiconducting materials. The particles may also be composed of organic material, such as semiconductor polymer particles, rubber particles, or another organic material suitable for a particular application.

For the purposes of this disclosure, the term "nanoparticle" is used in a broad sense, though for illustrative purposes only, some typical attributes of nanoparticles suitable for use in the implementations described herein are a particle size of between 1-100 nanometers and with regards to particle shape, an aspect ratio of between 1 and 1,000.

The nanoparticles may be functionalized to introduce chemical functionality to the nanoparticle. The nanoparticles may be functionalized to with one or more functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, and the like, and combinations thereof.

Exemplary nanoparticles that may be incorporated into the polyimide oligomer backbone include functionalized silsesauioxanes (e.g., polyhedral oligomeric silsesauioxanes (POSS)), functionalized carbon black, functionalized silicates, functionalized graphene, functionalized nanographite, functionalized carbon nanotubes, functionalized halloysite nanotubes, functionalized boron nitride nanotubes and combinations thereof. Such compounds are merely provided as non-exhaustive exemplary list of some (but not all) compounds suitable as building blocks for providing polyimide oligomers having nanoparticles incorporated in its backbone.

Silsesquioxane nanoparticles, as disclosed herein, are a class of inorganic-organic hybrid nanoparticles with reactive moieties. Silsesquioxane nanoparticles, also referred to as polysilsesquioxanes, polyorganosilsesquioxanes, or polyhedral oligomeric silsesquioxane (POSS) nanoparticles, are polyorganosilicon oxide compounds having the general formula $RSiO_{1.5}$ (where R is a hydrogen, inorganic group, or organic group such as methyl) having defined closed or open cage structures with chemically specific organic peripheral groups. The organic peripheral groups are covalently bonded to each silicon atom, which provides POSS molecules with specific interactions to other molecules in the medium.

Silsesquioxane nanoparticles can be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

Silsesquioxane nanoparticles can have any shape of cage structure such as cubes, hexagonal prisms, octagonal prisms, decagonal prisms, dodecagonal prisms, and the like. Additionally, the cage structure of the silsesquioxane nanoparticles comprises from 4 to 30 silicon atoms (e.g., from 4 to 20 silicon atoms; from 4 to 16 silicon atoms), with each silicon atom in the cage structure being bonded to oxygen. It should be noted that the term "cage structure" is meant to include the $SiO_{1.5}$ portion of the general silsesquioxane formula $RSiO_{1.5}$, and not the R-group.

Exemplary silsesquioxane nanoparticles usable herein include, but are not limited to, POSS molecules represented by the chemical formula $(SiO_{1.5})_n R_{n-1} R'$, wherein n=6, 8, 10, 12, R is alkyl having 1 to 6 carbon atoms or phenyl, R' is —$R_1$—B; $R_1$ is alkyl having 1 to 6 carbon atoms or phenyl, and B is selected from a group consisting of —$NH_2$, —OH, —Cl, —Br, —I, or other derivatives having a diamine group ($2NH_2$), for example, a reactive functional groups as —$R_1$—N(—Ar—$NH_2$)$_2$, —$R_1$—O—Ar—CH(—Ar—$NH_2$)$_2$, and the like.

Carbon black (CB) nanoparticles, as disclosed herein, include particulate carbon formed by the pyrolysis/incomplete combustion of heavy petroleum products. Carbon black is primarily an amorphous form of carbon having a greater or lesser concentration of graphitic phase distributed throughout the pigment. Carbon black is typically composed of domains of aromatic rings or small graphene sheets, wherein aromatic rings or graphene sheets in adjoining domains are connected through chemical bonds in the disordered phase (matrix).

Silicate nanoparticles, also referred to as silica nanoparticles, or nanosilica are $SiO_2$ particles.

Graphene and nanographene, as disclosed herein, are effectively two-dimensional particles having one or more layers of fused hexagonal rings with an extended delocalized π-electron system, layered and weakly bonded to one another. Graphene in general, including nanographene, can be a single sheet or a stack of several sheets having both micro- and nano-scale dimensions, such as in some implementations an average particle size of 1 to 20 micrometers (e.g., 1 to 15 micrometers), and an average thickness (smallest) dimension in nano-scale dimensions of less than or equal to 50 nm (e.g., less than or equal to 25 nm; less than or equal to 10 nm). An exemplary nanographene can have an average particle size of 1 to 5 micrometers (e.g., 2 to 4 micrometers).

Graphene can be prepared by exfoliation of graphite or by a synthetic procedure by "unzipping" a nanotube to form a nanographene ribbon, followed by derivatization of the nanographene to prepare, for example, graphene oxide.

Nanographite is a cluster of plate-like sheets of graphite, in which a stacked structure of one or more layers of graphite, which has a plate-like two dimensional structure of fused hexagonal rings with an extended delocalized i-electron system, are layered and weakly bonded to one another through n-n stacking interaction. Nanographite has a layered structure of greater than or equal to about 50 single sheet layers (e.g., greater than or equal to about 100 single sheet layers; greater than or equal to about 500 single sheet layers). Nanographite has both micro- and nano-scale dimensions, such as for example an average particle size of 1 to 20 micrometers (e.g., 1 to 15 micrometers), and an average thickness (smallest) dimension in nano-scale dimensions, and an average thickness of less than 1 micrometer (e.g. less than or equal to 700 nm; less than or equal to 500 nm).

Nanotubes include carbon nanotubes, inorganic nanotubes such as boron nitride nanotubes, metallated nanotubes, or a combination comprising at least one of the foregoing. Nanotubes are tubular structures having open or closed ends and which are inorganic (e.g. boron nitride) or made entirely or partially of carbon. In one implementation, carbon and inorganic nanotubes include additional components such as metals or metalloids, which are incorporated into the structure of the nanotube, included as a dopant, form a surface coating, or a combination comprising at least one of the foregoing. Nanotubes, including carbon nanotubes and inorganic nanotubes, are single walled nanotubes (SWNTs) or multi-walled nanotubes (MWNTs).

Carbon nanotubes and nanofibers are graphitic nanofilaments with diameters ranging from about 0.4 nanometers to about 500 nanometers and lengths which typically range from a few micrometers to a few millimeters. Graphitic nanofilaments may be categorized according to at least four distinct structural types, namely, tubular, herringbone, platelet, and ribbon. The term "nanotube" may be used to describe the tubular structure whereas "nanofiber" may describe the non-tubular forms.

Carbon nanotubes are generally classified as single-walled carbon nanotubes and multi-walled carbon nanotubes. The SWNT is a graphitic nanofilament which comprises a cylindrical carbon molecule that may be conceptualized as a one-atom thick sheet of graphite called graphene rolled into a seamless graphene tube. The graphene tube forms a cylindrical wall which is parallel to the filament axis direction. One or more of the nanotube ends may be capped by additional carbon atoms.

Halloysite is a material represented by $AlSi_2O_5$ $(OH)_4 \cdot 2H_2O$ and is an aluminum silicate clay mineral having a ratio of aluminum to silicon of 1:1. The halloysite is a nano-sized plate type and has a layer structure in which different layers are alternately layered in a ratio of 1:1. Moreover, the halloysite is naturally present in aluminosilicate. The outer surface of the halloysite typically comprises a silicate $SiO_2^-$ layer, and the inner surface comprises an alumina $Al_2O_3^+$ layer. The halloysite has a hollow nanotubular structure. In some implementations, the inner diameter of the halloysite nanotube is about 30 to 250 nm and the length is about 200 to 400 nanometers.

In one exemplary implementation, a resin system including polyimide oligomers having chemical backbones incorporating nanoparticles is provided for tailoring the mechanical properties of composites formed from the resin system while retaining ease of processing. The resin system can be a mixture of at least one of the following to achieve desired properties: (1) chemical backbones incorporating nanoparticles; (2) chemical backbones that are nanoparticles; (3) chemical backbones that do not incorporate nanoparticles: (4) difunctional endcaps; and (5) monofunctional endcaps. The chemical backbones may be the same. The chemical backbones may be different. The resin system typically comprises at least one monofunctionally or difunctionally endcapped chemical backbone, wherein the chemical backbone comprises a nanoparticle and at least one monofunctionally or difunctionally endcapped chemical backbone different from the chemical backbone comprising the nanoparticle. The at least one monofunctionally or difunctionally endcapped nanoparticle comprising chemical backbone may comprise at least one monofunctionally or difunctionally endcapped chemical backbone, wherein the chemical backbone has a nanoparticle incorporated in the chemical backbone and at least one monofunctionally or difunctionally endcapped nanoparticle.

In some implementations, the resin system may be a pre-imidized mixture of monofunctionally and/or difunctionally endcapped chemical backbones. The chemical backbones may all possess the same endcap chemistry. Pre-imidization of the oligomers typically avoids condensation reactions during chain extension. In some implementations, the resin system may be a mixture of components (e.g., monofunctional and/or difunctional endcaps, chemical backbones and functionalized nanoparticles) which are reacted in-situ to form endcapped chemical backbones in the resin system. The endcapped chemical backbones may be formed in-situ via, for example, PMR chemistry.

The ratio of components may be varied to achieve the desired mixture of processability and mechanical properties (e.g., stiffness and toughness). In some implementations, the ratio of difunctional endcaps to monofunctional endcaps may be varied. The resin system may include from about 0% to about 99% of the chemical backbones having monofunctional endcaps and from about 1% to about 100% of the chemical backbones having difunctional endcaps. The resin system may include from about 0% to about 75% of the chemical backbones having monofunctional endcaps and from about 25% to about 100% of the chemical backbones having difunctional endcaps. The resin system may include from about 1% to about 50% of the chemical backbones having monofunctional endcaps and from about 50% to about 99% of the chemical backbones having difunctional endcaps. The resin system may include from about 1% to about 25% of the chemical backbones having monofunctional endcaps and from about 75% to about 99% of the chemical backbones having difunctional endcaps.

In some implementations, the ratio of chemical backbones incorporating nanoparticles to chemical backbones without nanoparticles may be varied. The resin system may include from about 0% to about 99% of chemical backbones without nanoparticles and from about 1% to about 100% of the chemical backbones incorporating nanoparticles. The resin system may include from about 0% to about 75% of chemical backbones without nanoparticles and from about 25% to about 100% of the chemical backbones incorporating nanoparticles. The resin system may include from about 1% to about 50% of the chemical backbones without nanoparticles and from about 50% to about 99% of the chemical backbones incorporating nanoparticles. The resin system may include from about 1% to about 25% of the chemical backbones without nanoparticles and from about 75% to about 99% of the chemical backbones incorporating nanoparticles.

The chemical backbones of the monofunctional and difunctional endcapped groups may be different in order to confer improved processability or mechanical properties. As described herein, the chemical backbones present in the resin system may be independently selected from organic backbones, organic backbones incorporating nanoparticles, and nanoparticles bonded directly to the endcaps. The chemical backbones may be from different chemical families.

The resin system allows tailoring of the properties of high-performance composites. The resin system allows averaging of the properties of different polyimide oligomers to provide composites that do not have as severe shortcomings as the pure compounds. For example, the rigid nature of a resin system incorporating all difunctionally endcapped oligomers can be reduced by a resin system comprising a mixture of difunctionally and monofunctionally endcapped backbones. The resulting resin system will produce composites having improved stiffness relative to composites produced from a resin system having all monofunctionally endcapped oligomers and flexibility greater than composites produced from a resin system having all difunctionally endcapped oligomers. Accordingly, the resulting composites have a blending or averaging of physical properties, which makes them candidates for particularly harsh conditions.

While not wishing to be bound by theory, it is believed that the inclusion or exclusion of nanoparticles from the chemical backbones of the resin system allows further tailoring of the properties of high-performance composites. For example, the rigid nature of a resin system including all chemical backbones incorporating nanoparticles may be reduced by a resin system comprising a mixture of chemical backbones incorporating nanoparticles and chemical backbones without nanoparticles. It is also believed that the resulting resin system will produce composites having a use temperature (thermo-oxidative stability) higher than composites produced from a resin system having all chemical backbones without nanoparticles and flexibility greater than composites produced from a resin system having all chemical backbones incorporating nanoparticles. Accordingly, it is believed that the resulting composites have a blending or averaging of physical properties, which makes them candidates for particularly harsh conditions.

In one implementation, a polyimide oligomer having one or more nanoparticles incorporated into an oligomer backbone to increase thermo-oxidative stability is provided. In one implementation, the polyimide oligomer has the following formula:

$$Y_i\text{-}A\text{-}Y_i$$

wherein:

i=1 or 2; and

A is a chemical backbone comprising one or more nanoparticles. The one or more nanoparticles may be incorporated in the chemical backbone. The one or more nanoparticles may be the chemical backbone. It is believed that incorporation of one of more nanoparticles into the backbone increases thermo-oxidative stability of the polyimide oligomer. In some implementations, the chemical backbone A may further include aromatic (e.g., phenyl) radicals between linkages, although they may have other aromatic, aliphatic, or aromatic and aliphatic radicals.

Y may be an endcap having the desired crosslinking functionality. Y may be any endcap having at least one crosslinking functionality such as a mono-functional endcap. Y may be any endcap having two or more crosslinking functionalities such as a multi-functional or di-functional endcap. Y may be selected from mono-functional endcaps and di-functional endcaps. Exemplary endcaps that may be used with the implementations described herein include nadic endcaps, dinadic endcaps, phenylethynyl endcaps and diphenylethynyl endcaps. Exemplary phenylethynyl endcaps and diphenylethynyl endcaps that may be used with the implementations described herein are described in U.S. Pat. No. 5,817,744 titled Phenylethynyl Capped Imides to Shepard et al. and U.S. Pat. No. 8,106,142 titled Polyacetylinic Oligomers to Tsotsis et al. both of which are incorporated by reference in their entirety. Exemplary nadic and dinadic endcaps that may be used with the implementations described herein are described in U.S. Patent Application Publication No. 2008/0300374 titled Dinadic Phenyl Amine Reactive Endcaps to Lubowitz et al.

In one implementation, Y is derived from a nadic phenyl amine endcap monomer for application in high temperature polymeric composites. Exemplary nadic phenyl amine endcap monomers may be selected from the following formulae:

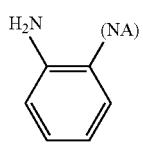
(1)

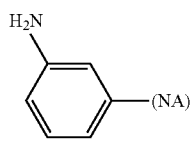
(2)

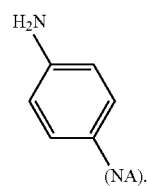
(3)

In one implementation, Y is derived from a dinadic phenyl amine endcap monomer for application in high temperature polymeric composites. Exemplary dinadic phenyl amine endcap monomers may be selected from the following formulae:

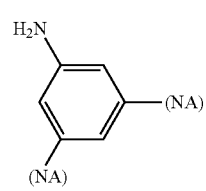
(4)

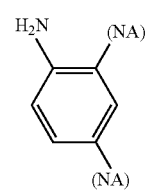
(5)

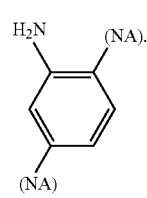
(6)

(NA) is nadic anhydride illustrated by the formula:

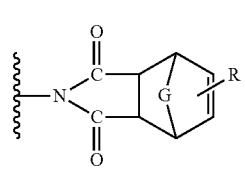
(7)

wherein:

G=—$CH_2$—, —$SO_2$—, —S—, —O—, or —CO—, and

R=hydrogen, lower alkyl (e.g., saturated or unsaturated, linear or branched), phenyl, lower alkoxy, aryl, aryloxy, substituted aryl, substituted alkyl, or mixtures thereof.

Amines can be obtained by numerous methods known in the art including direct amination, arylation or alkylation of ammonia or amines and free radical addition of amines to olefins. Implementations of the dinadic phenyl amine reactive endcaps of the present disclosure can be readily synthesized by first converting 3,5-diamino benzoic acid to a dinadic carboxylic acid as follows:

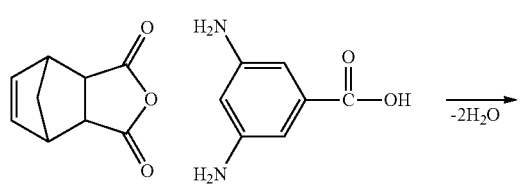

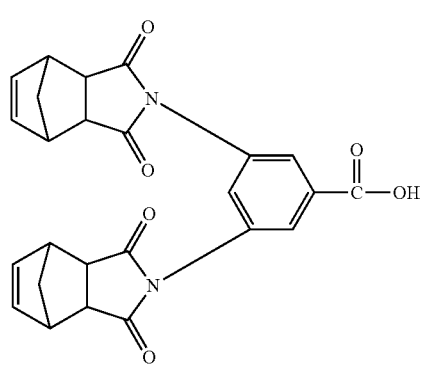

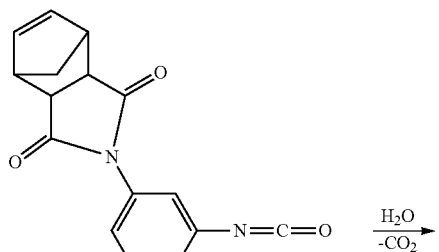

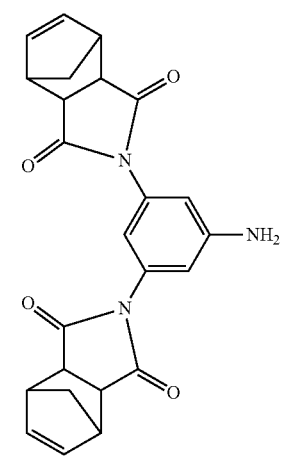

In one implementation, the dinadic carboxylic acid is reacted with sodium azide to form a cyanate, which is then converted to an amine by hydrolysis via a Curtius rearrangement as illustrated below:

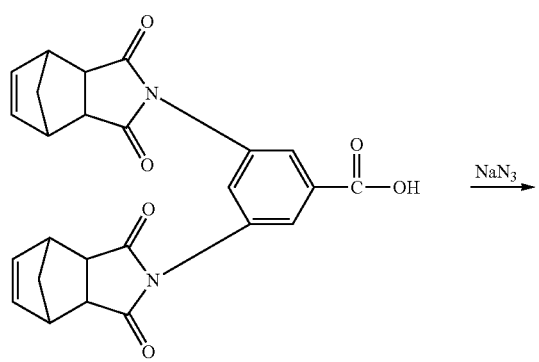

Alternatively, the dinadic carboxylic acid may be reacted with an azide under acidic conditions to form an acyl azide, which rearranges to an isocyanate. The isocyanate is hydrolyzed to carbamic acid and decarboxylated to form the amine as illustrated below:

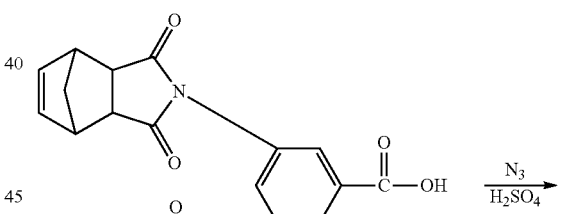

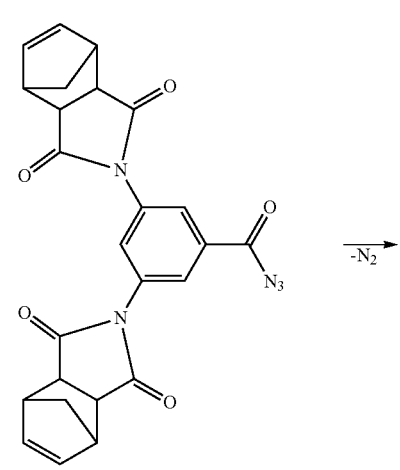

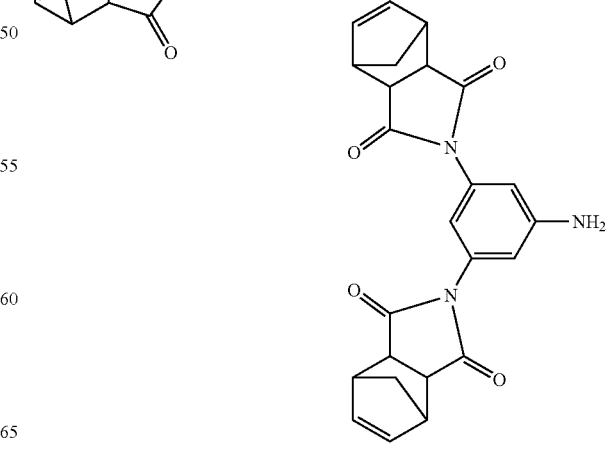

In one alternative implementation, dinadic phenyl amine reactive endcaps are synthesized by first converting 2,4-diamino phenol to form a dinadic phenol as follows:

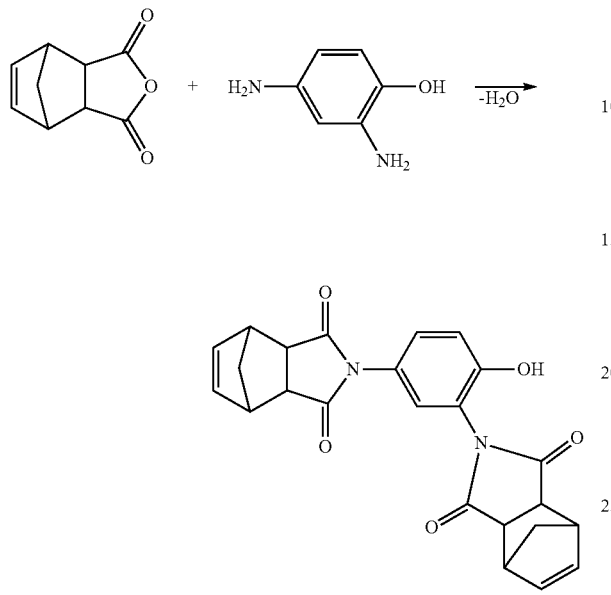

The dinadic phenol can be converted to a dinadic phenyl amine by utilizing either a Curtius rearrangement or a Schmidt reaction. Exemplary synthesis methods of the dinadic phenyl amine reactive endcaps of the present disclosure are further described in United States Patent Application Publication No. 2008/0300374, titled DINADIC PHENYL AMINE REACTIVE ENDCAPS, which is incorporated by reference herein in its entirety.

In one implementation, Y is derived from a phenylethynyl endcap monomer for application in high temperature polymeric composites. Exemplary phenylethynyl endcap monomers may be selected from the following formulae:

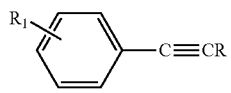 (8)

wherein R=hydrogen, lower alkyl, or phenyl.

In one implementation, Y is derived from a diphenylethynyl endcap monomer for application in high temperature polymeric composites. Exemplary diphenylethynyl endcap monomers may be selected from the following formulae:

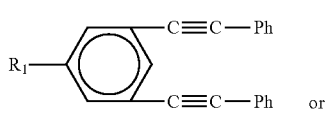

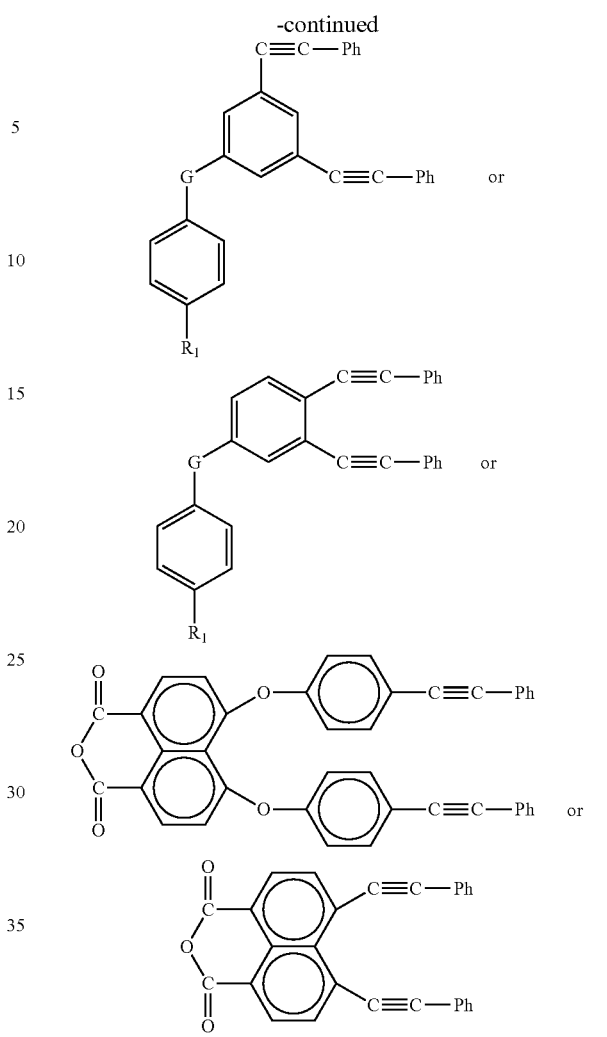

wherein
Ph=phenyl;
G=—SO—, —S—, —O—, —CH$_2$—, —CO—, —SO—, —CHR—, —CR$_2$—, C$_3$F$_6$, or NHCO; and
R$_1$=amine, hydroxyl, acid chloride, or anhydride, where R$_1$ is the point of attachment to the oligomeric backbone. In one implementation,

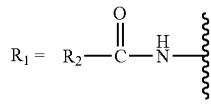

wherein R$_2$=hydrogen, lower alkyl (e.g., saturated or unsaturated, linear or branched), phenyl, lower alkoxy, aryl, aryloxy, substituted aryl, substituted alkyl, or mixtures thereof.

Diphenylethynyl endcap monomers can be obtained by numerous methods known in the art including by starting with brominated compounds, which are reacted with phenyl acetylene using palladium-based catalysts to replace the bromines with phenylethynyls. For example, the diphenylethynyl endcap monomers can be prepared by the following reaction scheme:

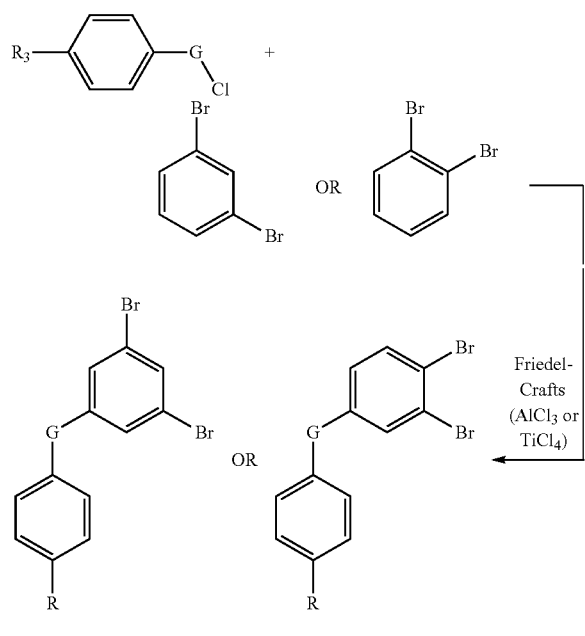
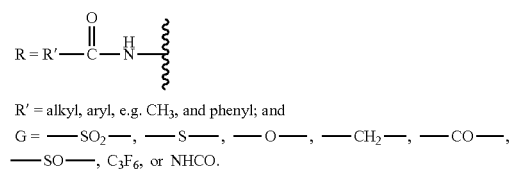
R' = alkyl, aryl, e.g. CH$_3$, and phenyl; and
G = —SO$_2$—, —S—, —O—, —CH$_2$—, —CO—, —SO—, C$_3$F$_6$, or NHCO.
The bromine compounds are then reacted with a phenylethynyl acetylene using a palladium catalyst:
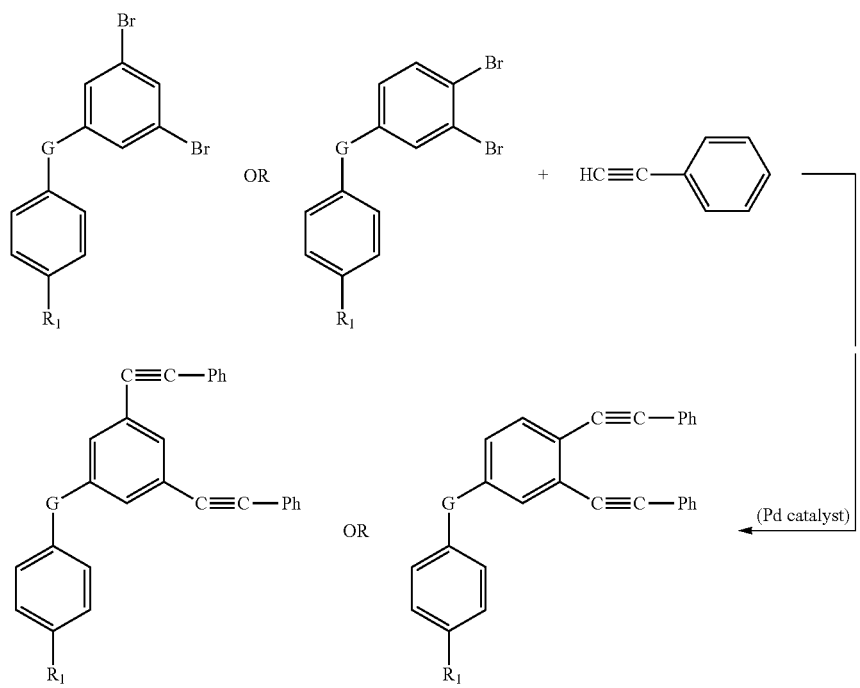
wherein
Ph = phenyl
R$_1$ = amine, hydroxyl, acid chloride, or anhydride.
In another implementation, the following reaction scheme can be used.
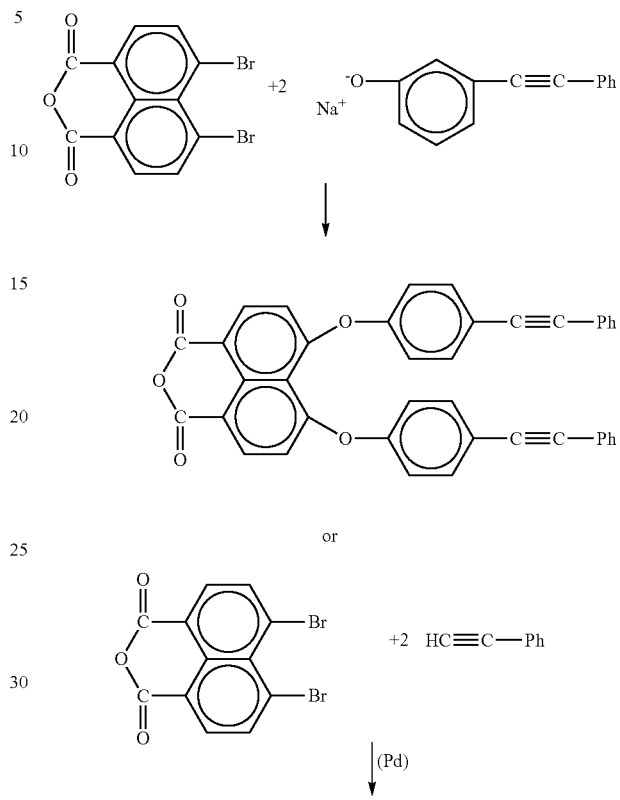

-continued

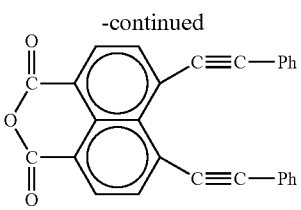

Suitable palladium catalyst to be used for displacement of a halogen atom from an organic moiety with an acetylinic moiety, include, but are not limited to: Pd/(PPh$_3$)$_2$; PdCl$_2$/(PPh$_3$)$_2$; PdCl$_2$/CuCl$_2$/LiCl; Pd(OAc)$_2$/PPh$_3$/Et$_3$N; Pd/(PPh$_3$)$_4$. Also, palladium-on-carbon (5% Pd/C); (30% Pd/C) or palladium black (pure Pd) can be used. Additionally, PdO or Pd(OAc)$_2$/benzimidazolium salts can be used. In an exemplary implementation, the palladium catalyst, for example, Pd/(PPh$_3$)$_2$ or PdCl$_2$/(PPh$_3$)$_2$, is used in the presence of a base, for example, triethyethylamine, a Cu(I) salt, and a solvent, for example, a polar solvent, for example, tetrahydrofuran.

The acetylene arylation reaction is run in an inert atmosphere at atmospheric pressure at a temperature of 65-85° C. for varying lengths of time, ranging from 6-48 hours, depending on the particular aryl bromide used in the reaction. The time and temperature required is dependent on the nature and position of other substituents on the aromatic nucleus of the aryl bromide.

Other useful amines which can be used in place of triethylamine include, for example, diethylamine, butylamines, pyridine and the like.

A co-solvent such as toluene, xylene, dimethylformamide, or dimethylacetamide can also be used to improve the solubility of the reactants and/or product. The reaction requires the presence of a homogenous palladium catalyst which, for example, can be bis (triphenylphosphine) palladium (II) chloride or tetrakis (triphenylphosphine) palladium (O). To improve the utility of the palladium catalyst, an excess of the phosphine ligand is used. Examples of such phosphine ligands include: triorthotoluylphosphine and triphenylphosphine which is preferred because of its availability and cost. The use of palladium complexes to catalyze reactions of this type is described in the literature, for example, F. R. Heck and H. A. Dieck, J. Organometallic Chem., 93, p. 259-263 (1975). To further facilitate the reaction a co-catalyst may also be used.

Suitable co-catalysts include cuprous salts, for example, cuprous chloride, cuprous bromide, and cuprous iodide. The reaction is monitored by gas or thin-layer chromatography, monitoring the disappearance of reactants and/or appearance of product.

Exemplary synthesis methods of the diphenylethynyl endcap monomers of the present disclosure are further described in U.S. Pat. No. 8,106,142, titled POLYACETYLINIC OLIGOMERS, which is incorporated by reference herein in its entirety.

Chemical backbone A in formula Y$_i$-A-Y$_i$ is typically a chemical backbone comprising one or more nanoparticles. The one or more nanoparticles may be incorporated in the chemical backbone. The one or more nanoparticles may be the chemical backbone A. The chemical backbone A may be composed of all organic components. The chemical backbone A may be composed of all inorganic components. The chemical backbone A may be composed of a mixture of inorganic and organic components.

The chemical backbone A may be an aromatic, aliphatic, or aromatic/aliphatic hydrocarbon backbone incorporating the one or more nanoparticles. The chemical backbone A may be a backbone incorporating the one or more nanoparticles. The chemical backbone A may further include moieties selected from the group consisting of: imidesulfone, ether, ethersulfone, amide, imide, ester, estersulfone, etherimide, amideimide, oxazolyl, oxazolyl sulfone, thiazolyl, thiazolyl sulfone, imidazolyl, imidazolyl sulfone, heterocyclyl sulfone and combinations thereof. In some implementations, the chemical backbone A may further include aromatic (e.g., phenyl) radicals between linkages, although they may have other aromatic, aliphatic, or aromatic and aliphatic radicals. Without being bound by theory, it is believed that inclusion of the at least one nanoparticle into the chemical backbone A leads to crosslinking not only at the endcaps but also at the nanoparticle within the backbone of the oligomer itself.

Nanoparticles, from which the derivatized nanoparticles are formed, are generally particles having an average particle size in at least one dimension, of less than one micrometer (µm). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Nanoparticles may include both particles having an average particle size of 250 nm or less, and particles having an average particle size of greater than 250 nm to less than 1 µm (sometimes referred to in the art as "sub-micron sized" particles). In one implementation, a nanoparticle may have an average particle size of about 0.01 to about 500 nanometers (nm), specifically 0.05 to 250 nm, more specifically about 0.1 to about 150 nm, more specifically about 0.5 to about 125 nm, and still more specifically about 1 to about 75 nm. The nanoparticles may be monodisperse, where all particles are of the same size with little variation, or polydisperse, where the particles have a range of sizes and are averaged. Nanoparticles of different average particle size may be used, and in this way, the particle size distribution of the nanoparticles may be unimodal (exhibiting a single distribution), bimodal exhibiting two distributions, or multi-modal, exhibiting more than one particle size distribution.

The nanoparticle may be any nanoparticle capable of incorporation into the polyimide oligomer backbone that provides improved thermo-oxidative stability. The nanoparticle may be an organic nanoparticle. The nanoparticle may be an inorganic nanoparticle. The nanoparticle may be a combination of both organic and inorganic components. Exemplary nanoparticles that may be incorporated into the polyimide oligomer backbone include functionalized silsesauioxanes (e.g., polyhedral oligomeric silsesauioxanes (POSS)), functionalized carbon black, functionalized silicates, functionalized graphene (e.g., nanographene), functionalized nanographite, functionalized carbon nanotubes (e.g., single- or multiwalled nanotubes), functionalized halloysite nanotubes, functionalized boron nitride nanotubes and combinations thereof.

The nanoparticles used herein are typically derivatized to include one or more functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, and the like, and combinations thereof. The nanoparticles are derivatized to introduce chemical functionality to the nanoparticle. For example, for carbon nanotubes, the surface and/or edges of the carbon nanotubes may be derivatized to increase stiffness of the polyimide oligomer.

In one implementation, the nanoparticle is derivatized by, for example, amination to include amine groups, where amination may be accomplished by nitration followed by reduction, or by nucleophilic substitution of a leaving group by an amine, substituted amine, or protected amine, followed by deprotection as necessary. In another implementation, the nanoparticle can be derivatized by oxidative methods to produce an epoxy, hydroxy group or glycol group using peroxide, or by cleavage of a double bond by for example a metal-mediated oxidation such as a permanganate oxidation to form ketone, aldehyde, or carboxylic acid functional groups.

In another implementation, the nanoparticle can be further derivatized by grafting certain polymer chains to the functional groups. For example, polymer chains such as acrylic chains having carboxylic acid functional groups, hydroxy functional groups, and/or amine functional groups, polyamines such as polyethyleneamine or polyethyleneimine; and poly(alkylene glycols) such as poly(ethylene glycol) and poly(propylene glycol), may be included by reaction with functional groups.

The functional groups of the derivatized nanoparticles may be selected such that the derivatized nanoparticles will be incorporated into the backbone of the polyimide oligomer to impart improved properties such as higher stiffness.

The exemplary sequence below illustrates the functionalization of an exemplary silicate nanoparticle (e.g., an amine-functionalized silica nanoparticle).

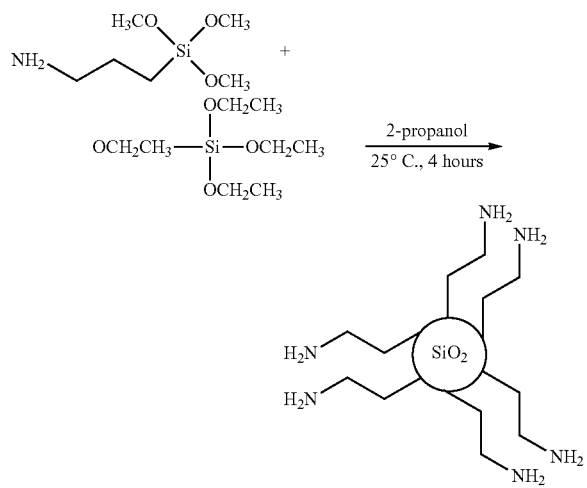

The amine-functionalized silica nanoparticle may be prepared as follows: 0.05 mol of (3-aminopropyl) trimethoxysilane and 0.2 mole of tetraethyl orthosilicate may be reacted in the presence of 2-propanol and nonionic surfactant for 4 hours at 25 degrees Celsius. The precipitate may be filtered, washed with deionized water and dried.

The nanoparticles can also be blended in with other, more common filler particles such as carbon black, mica, clays such as e.g., montmorillonite clays, silicates, glass fiber, carbon fiber, and the like, and combinations thereof.

In one implementation, the nanoparticles are present in the amount of about 0.001 to about 10 wt. % based on the total weight of the resin system. In another implementation, the nanoparticles are present in the amount of about 0.01 to about 5 wt. % based on the total weight of the resin system. In yet another implementation, the nanoparticles are present in the amount of about 0.01 to about 1 wt. % based on the total weight of the resin system.

One exemplary sequence illustrating the incorporation of a nanoparticle (e.g., carbon black) into a polyimide oligomer is disclosed in Fabrication of Polyimide Composite Films Based On Carbon Black For High-Temperature Resistance, Kwon, et al., *Polymer Composites* 2010 43 (22), 9337-9347.

In another implementation, an endcapped nanoparticle is provided. The endcapped nanoparticle may have the following formula:

$$Z_i\text{—}B\text{—}Z_i$$

wherein:

$i=1$ or 2;

Z is an endcap including at least one crosslinking functionality; and

B is a nanoparticle which serves as the backbone for the endcap Z. It is believed that using a nanoparticle as the backbone increases the mechanical performance and/or thermo-oxidative stability of the polyimide oligomer. In some implementations, the chemical backbone B may further include aromatic (e.g., phenyl) radicals between linkages, although they may have other aromatic, aliphatic, or aromatic and aliphatic radicals.

Z may be any endcap including the desired crosslinking functionality. Z may be any endcap including at least one crosslinking functionality such as a mono-functional endcap. Z may be any endcap including two or more crosslinking functionalities such as a multi-functional or di-functional endcap. Exemplary endcaps include nadic endcaps, dinadic endcaps, phenylethynyl endcaps and diphenylethynyl endcaps as previously described herein.

The nanoparticle B may be any nanoparticle that provides improved thermo-oxidative stability and is capable of functioning as a backbone for the endcap Z. The nanoparticle B may be any of the nanoparticles previously described herein.

In one implementation, B is POSS and Z is (phenylethynylphthalimide) PEPA. Exemplary POSS with a PEPA moiety that may be used with the implementations described herein are disclosed in Thermal Transitions and Reaction Kinetics of Polyhederal Silsesquioxane containing Phenylethynylphthalimides, Seurer, Vij, Haddad, Mabry, and Lee, *Macromolecules* 2010 43 (22), 9337-9347. One known reaction scheme for formation of POSS with a PEPA moiety as disclosed in Seurer et al. is illustrated as follows:

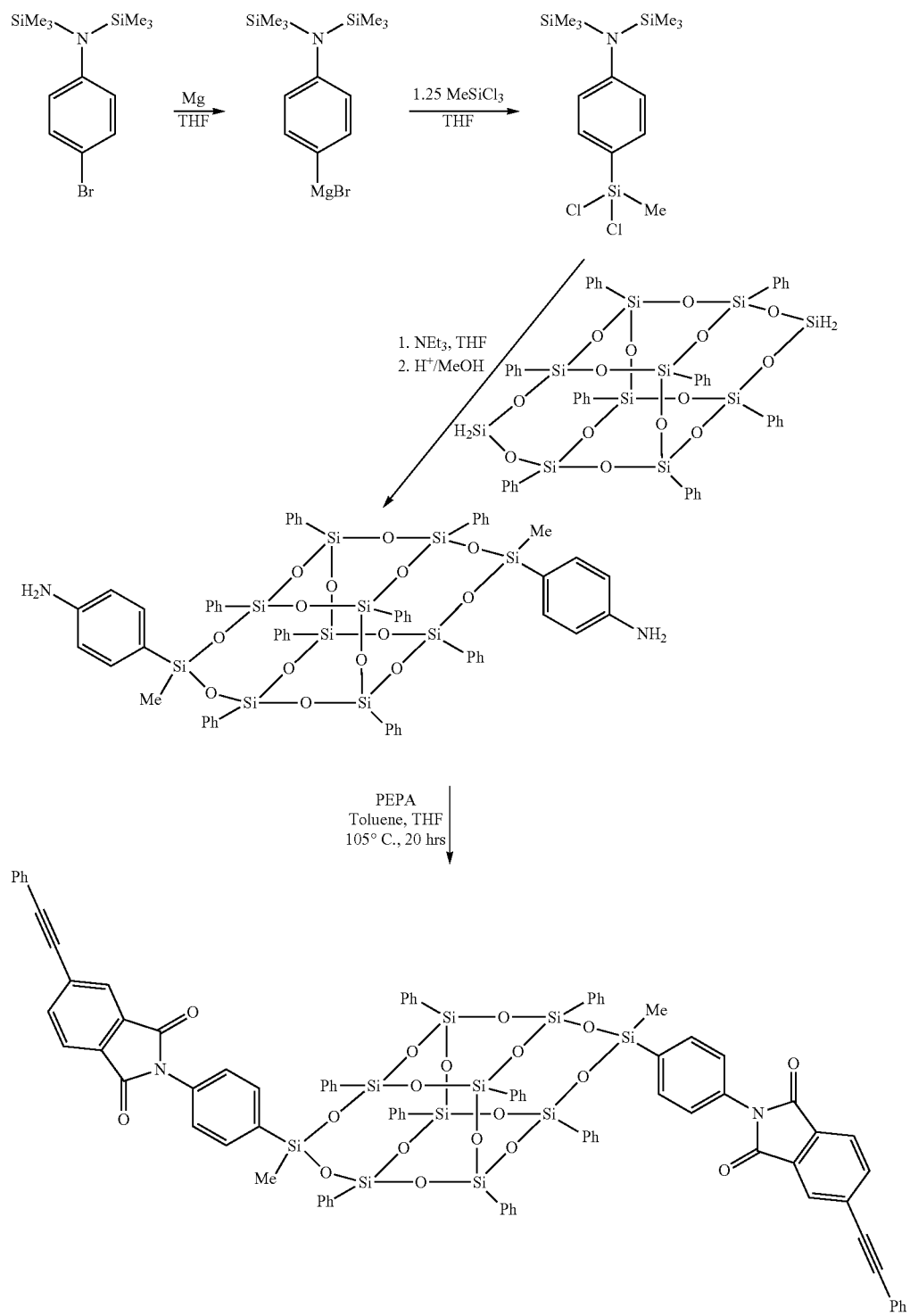

In another implementation, a polyimide oligomer having an oligomer backbone is provided. The polyimide oligomer having an oligomer backbone may be combined with any of the aforementioned polyimide oligomers having nanoparticles incorporated therein. In one implementation, the polyimide oligomer having an oligomer backbone has the following formula:

$$D_i\text{-}Q\text{-}D_i$$

wherein:

i=1 or 2;

D is an endcap including at least one crosslinking functionality; and

Q is an aromatic, aliphatic, or aromatic/aliphatic hydrocarbon backbone. In some implementations, the backbone (Q) is selected from the group consisting of imidesulfone; ether; ethersulfone; amide; imide; ester; estersulfone; etherimide; amideimide; oxazole; oxazole sulfone; thiazole; thiazole sulfone; imidazole; and imidazole sulfone. The backbone (Q) does not contain a nanoparticle. In some implementations, the chemical backbone Q may further include aromatic (e.g., phenyl) radicals between linkages, although they may have other aromatic, aliphatic, or aromatic and aliphatic radicals. Exemplary backbones are described in U.S. Pat. No. 5,817, 744 titled Phenylethynyl Capped Imides to Shepard et al., U.S. Pat. No. 8,106,142 titled Polyacetylinic Oligomers to Tsotsis et al., and U.S. Patent Application Publication No. 2008/0300374 titled Dinadic Phenyl Amine Reactive Endcaps to Lubowitz et al. all of which rare incorporated by reference in their entirety.

In some implementations, $D_i$-Q-$D_i$ comprises the reaction product of at least one of the aforementioned endcap monomers and a chemical backbone according to the formula:

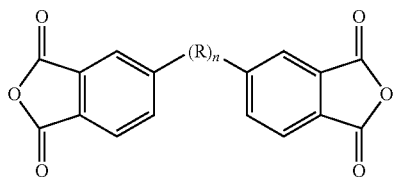

wherein R is selected from the group consisting of:

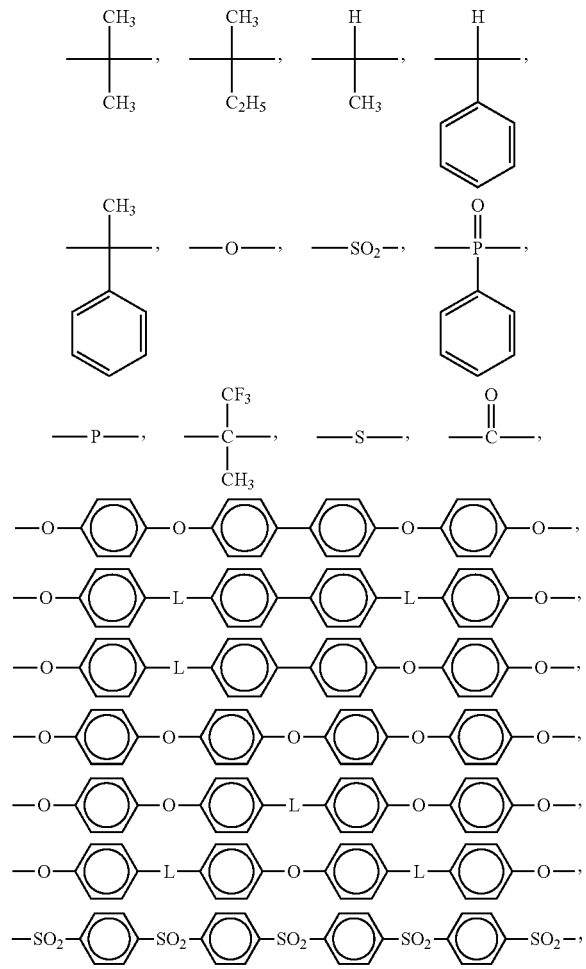

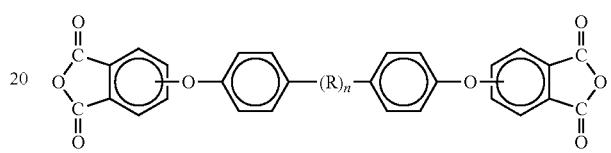

wherein L is —$CH_2$—, —$(CH_3)_2C$—, —S—, —$SO_2$— or —CO—; and wherein y is —S—, —$SO_2$— or —$(CF_3)_2C$—, —O—, —$(CH_3)_2C$—; and in certain implementations, n is selected such that the molecular weight does not exceed about 3000.

In another implementation, polyimide oligomers of the present disclosure comprise the reaction product of at least one of the aforementioned endcap monomers and a chemical backbone according to the formula:

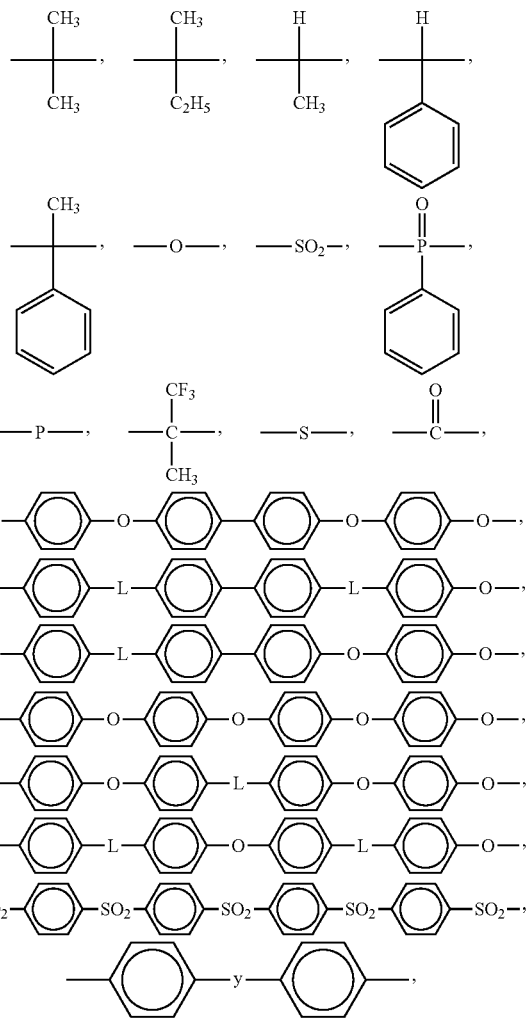

wherein R is selected from the group consisting of:

wherein L is —CH$_2$—, —(CH$_3$)$_2$C—, —S—, —SO$_2$— or —CO—; and wherein y is —S—, —SO$_2$— or —(CF$_3$)$_2$C—, —O—. —(CH$_3$)$_2$C—; and in certain implementations, n is selected such that the molecular weight does not exceed about 3000.

In addition to the traditional schemes for synthesizing polyimide oligomers, various polyimide oligomer implementations of the of the present disclosure can be formed by directly reacting at least one of the aforementioned endcaps with any chemical backbone that is capable of reacting with an amine and is suitable for high-temperature composites. In various implementations, at least one of the aforementioned endcaps is directly reacted with a precursor capped with acid anhydrides to form an oligomer which is suitable for high-temperature composites. The direct reaction between a dinadic amine endcap and an acid anhydride-capped precursor forms a tetrafunctional oligomer appropriate for high-temperature composites. Accordingly, implementations of the present disclosure provide a method of synthesizing an endcapped oligomer suitable for high-temperature compositions whereby costly intermediate steps are eliminated.

D may be any endcap including the desired crosslinking functionality. D may be any endcap including at least one crosslinking functionality such as a monofunctional endcap. D may be any endcap including two or more crosslinking functionalities such as a multifunctional or difunctional endcap. Exemplary endcaps include nadic endcaps, dinadic endcaps, phenylethynyl endcaps and diphenylethynyl endcaps including the endcaps previously described herein. Exemplary phenylethynyl endcaps and diphenylethynyl endcaps are described in U.S. Pat. No. 5,817,744 titled Phenylethynyl Capped Imides to Shepard et al. and U.S. Pat. No. 8,106,142 titled Polyacetylinic Oligomers to Tsotsis et al. both of which are incorporated by reference in their entirety. Exemplary nadic and dinadic endcaps are described in U.S. Patent Application Publication No. 2008/0300374 titled Dinadic Phenyl Amine Reactive Endcaps to Lubowitz et al.

Polyimide oligomers of the formula: D$_i$-Q-D$_i$ may be prepared by reacting the suitable endcap monomers with the monomer reactants that are commonly used to form the desired backbone. For example, an imide or an imidesulfone is prepared by reacting an endcap monomer with a diamine and a dianhydride in accordance with the method described in U.S. Pat. No. 4,584,364. Ethersulfones can be prepared by reacting an endcap monomer with a suitable dialcohol (i.e., diol, bisphenol, or dihydric phenol) and a dihalogen as described in U.S. Pat. No. 4,414,269 or other condensation reactions.

The resin system previously described herein can comprise at least one of Y$_i$-A-Y$_i$ and Z$_i$—B—Z$_i$ combined with D$_i$-Q-D$_i$. The resin system can comprise any ratio of the aforementioned polyimide oligomers. As previously discussed the polyimide oligomers may be pre-imidized or formed in-situ. Changing the ratio of the polyimide oligomers typically changes the physical properties in the final composites. Curing the polyimide oligomers involves mutual (interlinking) polymerization and addition polymerization.

The individual polyimide oligomers should initially have relatively low average formula weights and, accordingly, should remain relatively easy to process until curing when the extended chain is formed to produce the composite. For nadic and dinadic endcaps curing is typically performed under pressure to prevent volatilization of cyclopentadiene. For phenylethynyl and diphenylethynyl endcaps, vacuum processing may be used.

Another aspect of the present disclosure pertains to producing high-temperature composites. Resin systems produced in accordance with implementations of the present disclosure exhibit densities less than those of metal counterparts. Accordingly, composites comprising polyimide resins having endcapped oligomers with nanomodified backbones are ideal for replacing metallic structures to reduce weight. Where high-temperature strength also drives the design, a material with higher allowable strength at elevated temperatures, such as composite implementations of the present disclosure, will reduce overall structural weight. Composites manufactured in accordance with implementations of the present disclosure can be used to replace other high-temperature composites that require a thermal-protection layer.

Composites and prepregs comprising polyimide oligomer compositions formulated according to implementations of the present disclosure can by prepared by any conventional technique known in the art. For example, in certain implementations the polyimide oligomers exhibit a melt viscosity such that a composite can be prepared by known liquid-molding techniques such as resin-transfer molding and resin film infusion, among others. Depending on the application, the reinforcement materials can include, without limitation, for example, woven, braided, or knit fabrics, continuous or discontinuous fibers (in chopped or whisker form), ceramics, organics, carbon (graphite), or glass.

For example, a composite can be manufactured by impregnating reinforcing materials with a pre-imidized composition according to implementations of the present disclosure and cured anaerobically and under sufficient pressure to prevent the creation of voids. If the polyimide oligomers having nanomodified backbones are nadic endcapped, curing will initially release cyclopentadiene. In such cases, the applied pressure during curing should be sufficient to prevent volatilization of the cyclopentadiene and thereby cause the cyclopentadiene to react with the resin itself and become incorporated into the backbone. Suitable pressures for composite fabrication range from atmospheric to 1,000 psi depending upon the nature of the polyimide composition. Depending on the specific polyimide composition to be cured, the resin systems may be cured at temperatures known in the art. For example, the resin systems by be cured by subjecting them to temperatures ranging from about 200 degrees Celsius to about 350 degrees Celsius.

While the foregoing is directed to implementations of the present disclosure, other and further implementations of the disclosure may be devised without departing from the basic scope thereof, and the scope thereof is determined by the claims that follow.

All mentioned documents are incorporated by reference as if herein written. When introducing elements of the present disclosure or exemplary aspects or implementation(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific implementations, the details of these implementations are not to be construed as limitations.

What is claimed is:

1. A resin system, comprising:
   a first capped oligomer having the formula:

Y$_i$-A-Y$_i$, wherein:
   i=1 or 2;
   Y is a nadic or dinadic functional endcap; and A is a chemical backbone, wherein the chemical backbone comprises one or more nanoparticles; and a second capped oligomer having the formula:

$$D_i\text{-Q-}D_i,$$

wherein:

i=1 or 2;

D is a nadic or dinadic functional endcap; and

Q is a hydrocarbon backbone.

2. The resin system of claim 1, wherein:

from about 1% to about 25% of the chemical backbones and hydrocarbon backbones have nadic endcaps; and from about 75% to about 99% of the chemical backbones and hydrocarbon backbones have dinadic endcaps.

3. The resin system of claim 1, wherein the one or more nanoparticles are inorganic nanoparticles.

4. The resin system of claim 1, wherein the one or more nanoparticles are organic nanoparticles.

5. The resin system of claim 1, wherein the one or more nanoparticles have inorganic portions and organic portions.

6. The resin system of claim 1, wherein the one or more nanoparticles are selected from the group consisting of: functionalized silsesauioxanes, functionalized carbon black, functionalized silicates, functionalized graphene, functionalized nanographite, functionalized carbon nanotubes, functionalized halloysite nanotubes, functionalized boron nitride nanotubes and combinations thereof.

7. The resin system of claim 6, wherein the nanoparticles are functionalized with one or more functional groups selected from the group consisting of: carboxy, epoxy, ether, ketone, amine, hydroxy, alkoxy, alkyl, aryl, aralkyl, alkaryl, lactone, and combinations thereof.

8. The resin system of claim 1, wherein the chemical backbone further comprises one or more moieties selected from the group consisting of: imidesulfone, ether, ethersulfone, amide, imide, ester, estersulfone, etherimide, amideimide, oxazolyl, oxazolyl sulfone, thiazolyl, thiazolyl sulfone, imidazolyl, imidazolyl sulfone, heterocyclyl sulfone, and combinations thereof.

9. The resin system of claim 8, wherein the hydrocarbon backbone includes one or more moieties selected from the group consisting of: imidesulfone, ether, ethersulfone, amide, imide, ester, estersulfone, etherimide, amideimide, oxazolyl, oxazolyl sulfone, thiazolyl, thiazolyl sulfone, imidazolyl, imidazolyl sulfone, heterocyclyl sulfone, and combinations thereof.

10. The resin system of claim 1, wherein the dinadic functional endcaps are dinadic phenyl amine endcaps selected from the group consisting of:

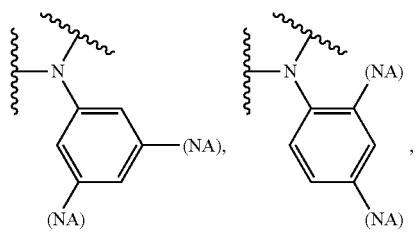

combinations thereof, wherein NA is a nadic anhydride.

11. The resin system of claim 10, wherein NA is illustrated by the formula:

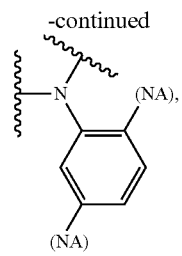

wherein

G=—$CH_2$—, —$SO_2$—, —S—, —O—, or —CO—, and

R=hydrogen, lower alkyl or phenyl.

12. The resin system of claim 1, wherein the nadic functional endcaps are nadic phenyl amine endcaps selected from the group consisting of:

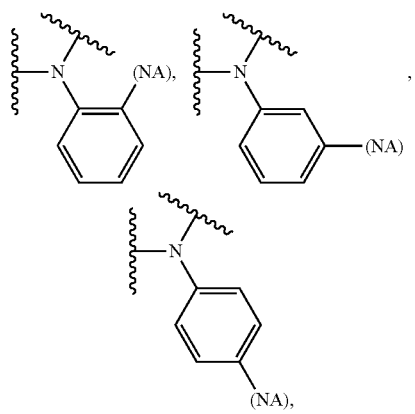

and combinations thereof, wherein NA is a nadic anhydride.

13. The resin system of claim 12, wherein NA is illustrated by the formula:

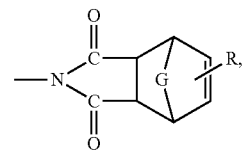

wherein

G=—$CH_2$—, —$SO_2$—, —S—, —O—, or —CO—, and

R=hydrogen, lower alkyl or phenyl.

14. A resin system according to claim 1, wherein at least part of the first capped oligomer is reacted with at least part of the second capped oligomer to form a reaction product.

15. The resin system of claim 1, wherein the one or more nanoparticles are covalently attached to Y.

16. A resin system, comprising:
a first capped oligomer having the formula:

$Y_i$-A-$Y_i$, wherein:
i=1 or 2;
Y is a nadic or dinadic functional endcap; and
A is a chemical backbone, comprising:
one or more nanoparticles selected from the group consisting of: functionalized silsesquioxanes, functionalized carbon black, functionalized silicates, functionalized graphene, functionalized nanographite, functionalized carbon nanotubes, functionalized halloysite nanotubes, functionalized boron nitride nanotubes and combinations thereof; and
one or more moieties selected from the group consisting of: imidesulfone, ether, ethersulfone, amide, imide, ester, estersulfone, etherimide, amideimide, oxazolyl, oxazolyl sulfone, thiazolyl, thiazolyl sulfone, imidazolyl, imidazolyl sulfone, heterocyclyl sulfone, and combinations thereof; and
a second capped oligomer having the formula:

$D_i$-Q-$D_i$, wherein:
i=1 or 2;
D is a nadic or dinadic functional endcap; and
Q is a hydrocarbon backbone.

17. The resin system of claim 16, wherein the dinadic functional endcaps are dinadic phenyl amine endcaps selected from the group consisting of:

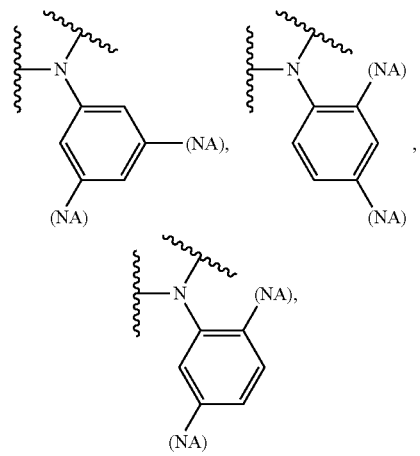

and combinations thereof, wherein NA is a nadic anhydride.

18. The resin system of claim 17, wherein NA is illustrated by the formula:

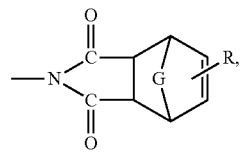

wherein
G=—$CH_2$—, —$SO_2$—, —S—, —O—, or —CO—, and
R=hydrogen, lower alkyl or phenyl.

19. The resin system of claim 16, wherein the nadic functional endcaps are nadic phenyl amine endcaps selected from the group consisting of:

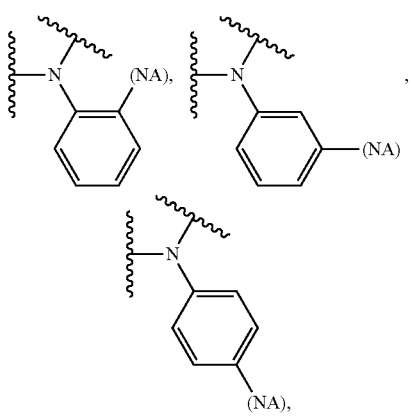

and combinations thereof, wherein NA is a nadic anhydride.

20. The resin system of claim 19, wherein NA is illustrated by the formula:

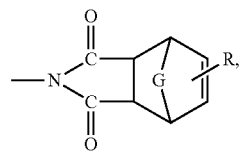

wherein
G=—$CH_2$—, —$SO_2$—, —S—, —O—, or —CO—, and
R=hydrogen, lower alkyl or phenyl.

* * * * *